June 11, 1946.    W. J. RADY    2,401,795
SYSTEM OF GENERATOR REGULATION
Filed Sept. 26, 1944    2 Sheets-Sheet 1

INVENTOR
William J. Rady
BY
Spencer Hardman & Fehr
his ATTORNEYS

June 11, 1946. W. J. RADY 2,401,795
SYSTEM OF GENERATOR REGULATION
Filed Sept. 26, 1944 2 Sheets-Sheet 2

INVENTOR
William J. Rady
BY
Spencer Hardman & Fehr
his ATTORNEYs

Patented June 11, 1946

2,401,795

UNITED STATES PATENT OFFICE 2,401,795

SYSTEM OF GENERATOR REGULATION

William J. Rady, Anderson, Ind., assignor to General Motors Corporation, Detroit, Mich., a corporation of Delaware Application September 26, 1944, Serial No. 555,881

7 Claims. (Cl. 320—39)

This invention relates to a system of regulation for a plurality of engine driven generators connected to a storage battery. The system may be used, for example, on a multi-engine airplane.

The object of the invention is to obtain such voltage regulation that all the generators will produce the same predetermined voltage. To accomplish this, each of the voltage regulators of the generators have a coil under the control by a source of constant voltage, and an equalizer coil. The equalizer coils are connected in series and with the negative brushes of the generators and the negative brushes are connected with the negative terminal of the storage battery by leads of the same resistance. The source of constant voltage is a constant-speed voltage-regulated generator of a standard primary cell.

Further objects and advantages of the present invention will be apparent from the following description, reference being had to the accompanying drawings, wherein two embodiments of the present invention are clearly shown.

Figure 1:
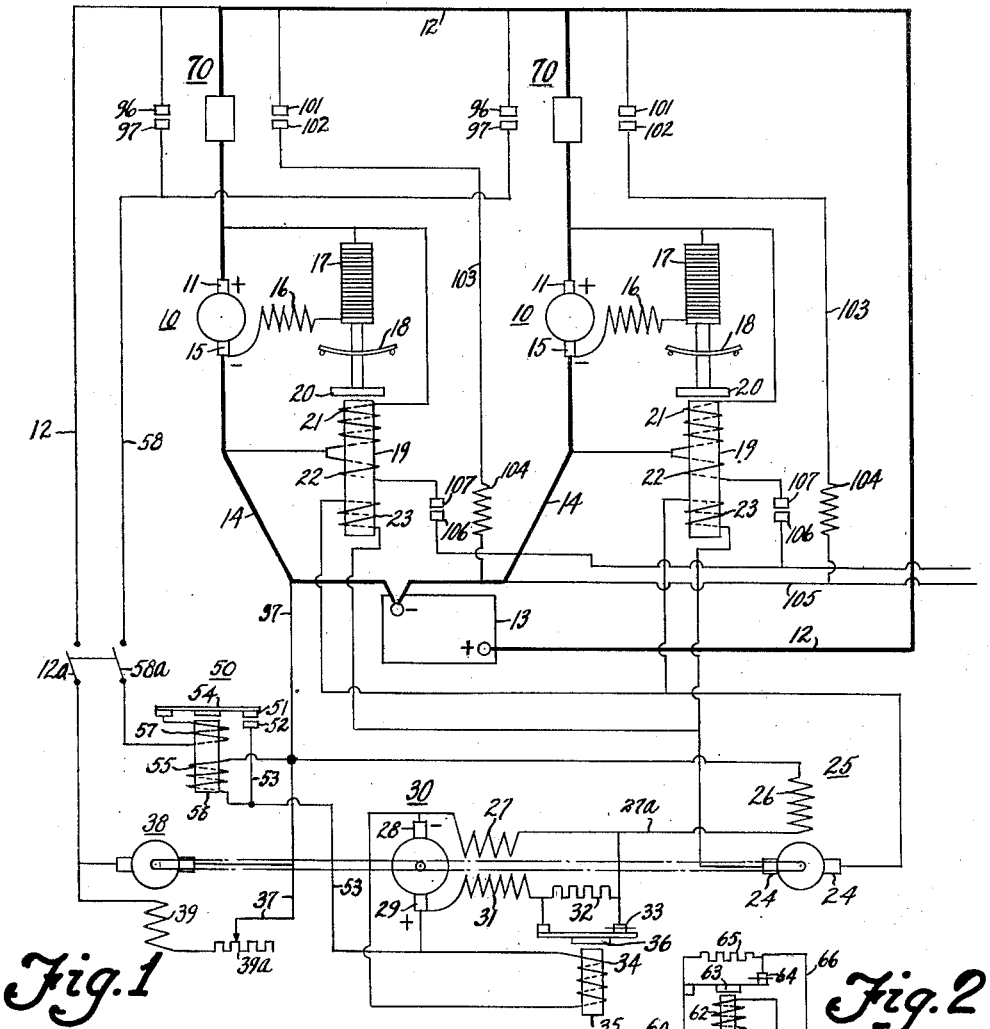
Fig. 1 is a wiring diagram of a form of the present invention including a constant voltage generator.

Two or more generators 10 have their positive brushes 11 connected by cutout units 70 and a wire 12 with the positive terminal of a storage battery 13 whose negative terminal is connected by wires 14 of equal resistance to the negative brushes 15 of these generators. The fields 16 of these generators are controlled by voltage regulators, each having a carbon pile 17 compressed by a spring 18 and controlled by an electromagnet having a core 19 and an armature 20 connected with the spring 18. Core 19 is surrounded by a coil 21 responsive directly to generator voltage and an equalizer coil 22. The coils 22 of the voltage regulators of the generators 10 are in a circuit connected with the negative brushes 15. When one generator 10 tends to produce a voltage exceeding the voltages of the other generators, a current flows in the coils 22 in such manner as to effect a reduction in voltage of that generator which tends to exceed and to effect an increase in the voltages of the generators which tend to be less. When the voltages of all generators 10 are equal, no current flows in the coils 22.

In order that the generators 10 will be regulated to produce a predetermined voltage, each voltage regulator has a coil 23 connected with the brushes 24 of a pilot generator 25 having a separately excited field 26 connected with the series field 27 of a compound-wound constant voltage generator 30 whose negative brush 28 is connected with field 27 and whose positive brush 29 is connected with a shunt field 31 connected with a regulating resistance 32 normally by-passed by voltage regulator contacts 33 under the control of an electromagnet having a voltage responsive coil 34 connected with the brushes 28 and 29. Coil 34 surrounds a core 35 located in proximity to a resiliently mounted movable armature 36 which, when attracted toward the core 34, separates the contacts 33. The voltage of generator 30 may be regulated either by the vibratory regulator shown in Fig. 1 or by the carbon pile regulator 40 shown in Fig. 2. Regulator 40 comprises a carbon pile 41 which is biased by a leaf spring 42 into a predetermined state of compression which determines the minimum resistance of the pile 41. The spring 42 is opposed by an electromagnet comprising an armature 43 and a coil 44 surounding a core 45. Coil 44 is connected across the generator brushes 28 and 29.

Negative brush 28 of generator 30 is connected with battery negative terminal through field 27 of generator 30, field 26 of pilot generator 25 and wire 37. Positive brush 29 is connected by wire 53 with contact 52 of a cutout relay 50 having a contact 51 engageable with the contact 52 and actuated by an armature 54 which cooperates with an electromagnet having a core 56 surrounded by windings 55 and 57. Winding 55 is connected with wires 53 and 37 and is responsive to the voltage of generator 30. Winding 57 is connected with armature 54 and by switch 58a and wire 58 with contacts 97 of relays 70. When any one of the relays 70 closes to connect its associated generator 10 with the battery 13, coil 57 is connected to wire 12 connected with battery positive terminal. When generator 30 attains a certain voltage about the same as battery charging voltage, relay 50 closes its contacts 51, 52. If manual control switch 58a is closed, and if at least one of the relays 70 closes, generator 30 becomes connected with the positive terminal of battery 13 through wire 53, contacts 52, 51, armature 54, coil 57, switch 58a, wire 58, contacts 97, 96 of relay 70 and wire 12. Generator 30 is connected with the negative terminal of battery 13 through its field 27, field 26 of generator 25 and wire 37. Therefore the field coil 26 of pilot generator 25 is responsive to the algebraic difference between the voltage of generator 30 and the battery charging voltage. When these voltages are equal, no current flows in field coil 26 of the pilot generator 25. When the battery charging voltage is less than the voltage of generator 30, current flows in the field coil 26 in a direction such as to cause the generator 25 to send current through coils 23 of the voltage regulators of generators 10 in such direction that coils 23 buck coils 21 of these voltage regulators to cause the voltage of the generators 10 to be increased. Conversely, when the battery charging voltage is greater than the voltage of generator 30, the current in field coil 26 flows in the opposite direction and the polarity of generator 25 is reversed so that coils 23 are caused to assist coils 21 of the voltage regulators of the generators 10, so that the generators 10 are regulated for a lower voltage. In this manner the voltage regulators of the generators 10 are under the control of the constant voltage generator 30 and are caused to effect a regulation of the voltages of generators 10 at a value equal to the voltage of the constant voltage generator. The equalizer coils 22 operate to cause the voltage regulators of the generators 10 to effect regulation at the same voltage. The constant voltage generator 30 acting through the pilot generator 25 operates to keep the battery charging voltage equal to the voltage of generator 30.

The two generators 25 and 30 are part of a small motor-generator set including a motor 38 which drives both generators. Motor 38 is connected with wire 37 and by a switch 12a with wire 12. The shunt field 39 of the motor 38 is connected between a motor brush and a variable speed controlling resistance 39a connected with wire 37. Switches 12a and 58a are preferably parts of a single manually operated switch so that the switch 58a is closed concurrently with the closing of switch 12a to cause the motor 38 to operate to drive the generators 25 and 30. When switch 12a is opened to stop the motor 38, switch 58a is opened to disconnect the battery B from generator 30.

Since the field 26 of the pilot generator 25 is subject to reversal of current flow and the field core iron is subject to reversal of flux, the core iron of generator 25 should be low in residual magnetism.

Figure 2:
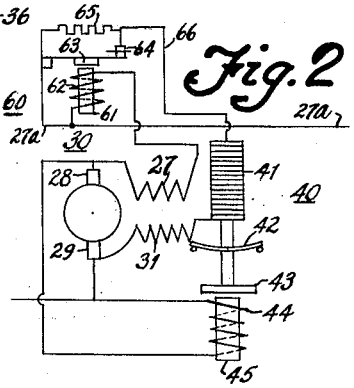
Fig. 2 shows diagrammatically the regulation of the constant voltage generator by a carbon pile voltage regulator.

When the system is operating properly, the algebraic difference between the voltages of the generator 30 and of the charging circuit are not very great. Therefore relay 50 remains closed so long as any one of the relays 70 are closed. When all generators 10 stop while generator 30 is operating, the contacts 96, 97 of all relays 70 are open and the connection of the battery 13 with generator 30 is interrupted. If the voltage of generator 30 should fall to a low value due to faulty operation while the motor 38 is still operating and at least one of the generators 10 is still charging, discharge of the battery will reverse current in coil 57 of relay 50 causing it to open to prevent further discharge. There is one case where the output of generator 30 would tend to be quite substantial; and that is when the generators 10 are charging the battery but not sufficiently to take care of the load on the battery. As shown in Fig. 2, for example, a current regulator 60 may be used with a voltage regulator to limit the output of generator 30 under the condition just mentioned. Current regulator 60 has a core 61 surrounded by a coil 62 in series with series field 27 of generator 30, wire 27a and field 26 of generator 25. Pile 41 is connected with wire 27a through wire 66, contacts 64 or resistance 65. The contacts are intermittently separated by a vibratory armature 63 connected with wire 27a.

Figure 3:
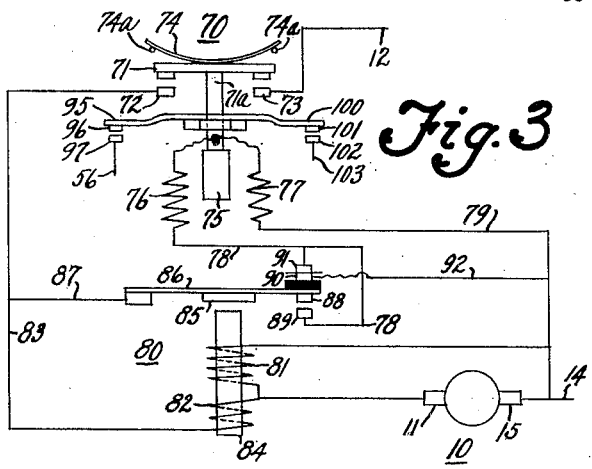
Fig. 3 shows diagrammatically one of the cutout units 70 included in Fig. 1.

The cut-out unit 70 comprises a circuit breaker relay comprising a contact 71 for engaging contacts 72 and 73 connected in the battery charging circuit as shown in Fig. 3. A spring 74, attached to the contact 71 and bearing against pins 74a, urges the contact 71 into the circuit opening position. A metal rod 71a connects the contact 71 with a solenoid armature 75 cooperating with solenoid windings 76 and 77 connected respectively with wires 78 and 79 which are connected respectively with a contact 89 and generator negative lead 14.

The windings 76 and 77 are controlled by a reverse current relay 80 having a winding 81 connected to the brushes 11 and 15 of the generator 10 and having a winding 82 connected with brush 11 and by wire 83 with contact 72 of the circuit breaker relay. Windings 81 and 82 surround a core 84 cooperating with an armature 85 carried by spring blade 86 connected by wire 87 with wire 83 and carrying a contact 88 for engaging contact 89. The blade 86 insulatingly supports a contact 90 connected by wire 92 with wire 79 and normally in engagement with a contact 91 connected with wire 78.

When the generator 10 has attained such speed that its voltage is greater than battery voltage, coil 81 becomes energized sufficiently to effect the downward movement of the armature 85 to cause the separation of contacts 90 and 91 and the closing of contacts 88 and 89. Then the following circuit is established: Generator brush 11, coil 82, wire 83, wire 87, blade 86, contact 88, contact 89, wire 78, coils 76 and 77, wire 79, wire 14, brush 15. Coils 76 and 77 operate cumulatively to cause downward movement of solenoid armature 75, thereupon causing the circuit breaker relay contact 71 to engage the contacts 72 and 73 to connect the generator 10 with battery 13. When the solenoid armature 75 has been moved into such position as to complete the battery charging circuit, the magnetism of coil 77 alone is sufficient to hold the armature in this position. Therefore, although contact 88 may move slightly away from contact 89, the circuit breaker relay contacts 77 will still be held in engagement with contacts 72 and 73 by the magnetic pull of coil 77 alone, the connection of coil 77 with the generator having been effected through contact 71 and rod 71a independently of the contacts 88 and 89. However, should the speed of the generator decrease to a value such that the generator no longer charges the battery, then the current in coil 82 reverses and produces magnetism which bucks the magnetism of coil 81, whereupon armature 85 returns to normal position under the influence of resilient blade 86 and contact 90 reengages contact 91, thereby causing curent to flow from the battery through the wire 12, contact 71, rod 71a and in a reverse direction through coil 76, said current returning to the battery by way of wire 78, contacts 91 and 90, wire 92 and wire 14. When this occurs, the magnetism of coil 76 bucks the magnetism of coil 77 and the circuit breaker relay contact 71 separates from contacts 72 and 73 to interrupt the circuit between the generator and the battery.

Since this circuit breaker relay can be made more rugged and less sensitive than the reverse current relay 80, the former can be used to control circuits other than the battery charging circuit. For such purposes, the rod 71a supports and is electrically connected with a conductor having resilient arms 95 and 100. The arm 95 carries a contact 96 for engaging a contact 97 connected with wire 58. Each unit 70 includes a pair of contacts 96 and 97 and these pairs of contacts are connected in parallel and altogether in series with wire 58 and coil 57 of the relay 50. Therefore, when any one of the generators 10 is connected with the battery 13, the coil 57 will be energized to close the relay 50, provided switch 58a has been closed coincidentally with the closing of the switch 12a which controls the motor 60.

The resilient arm 100 carries a contact 101 for engaging contact 102 connected by wire 103 with a relay coil 104 connected with the battery negative terminal. Therefore, when all of the generators 10 are connected with the battery 13, all of the relay coils 104 will be energized and the contacts 106, 107 will be closed in order to connect the equalizer coils 22. Therefore, when any one of the generators fails to charge the battery, the equalizer coil 22 of the voltage regulator associated therewith becomes ineffective, and the equalizer coils of the other generators remain effective to effect the equalization of voltage. That is, if two or more generators remain operative, their equalizer coils 22 will be able to function without interference by the disabled generator. However, if only one generator remains operative, the equalizer coil of its voltage regulator is not connected. Obviously, such connection is not required since there is no equalization of voltage to be effected if only one generator remains operative.

Figure 4:
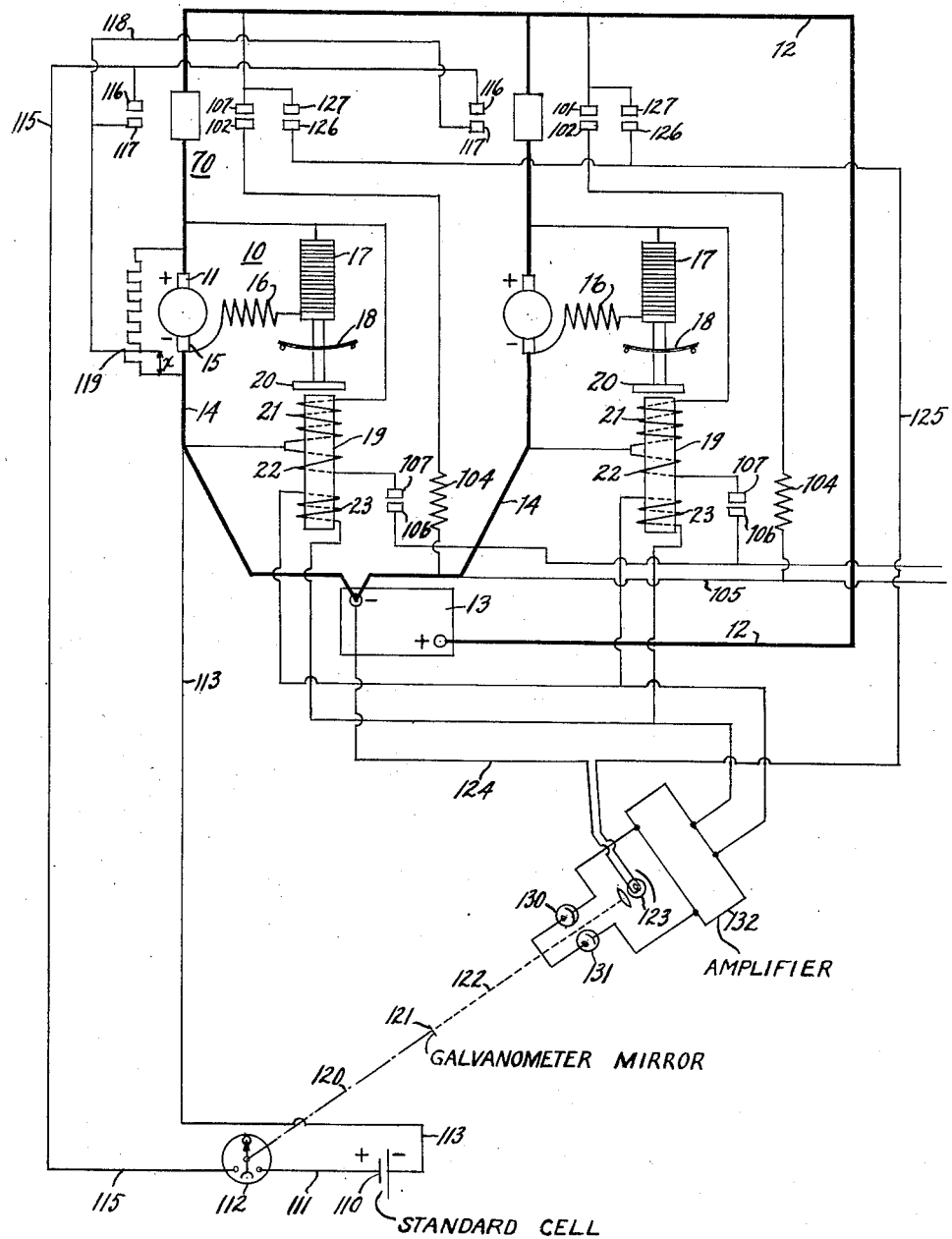
Fig. 4 is a wiring diagram of another form of the invention including a standard primary cell.

In the embodiment of the invention shown in Fig. 4, the coils 23 are controlled by standard cell 110 having its positive terminal connected by wire 111 with a galvanometer 112 and its negative terminal connected by wire 113 with generator negative lead 14. Galvanometer 112 is connected by wire 115 with switch contacts 116 connected in parallel and adapted to engage contacts 117 connected by wire 118 so connected with a voltage divider 119 that the voltage, represented by $x$, is equal to the voltage of the standard cell. Any pair of the contacts 116 and 117 are caused to engage when a unit 70 connects a generator 10 with the battery 13. It will be understood that these contacts are mounted and controlled in a manner similar to contacts 96 and 97 of control 70 shown in Fig. 3.

The galvanometer operates a shaft 120 carrying a galvanometer mirror 121 for receiving a beam of light 122 projected from an electric lamp 123, one terminal of which is connected by wire 124 with battery 13, the other terminal being connected by wire 125 with contacts 126 in parallel and adapted to engage contacts 127 connected with positive lead 12. The contacts 126 and 127 are closed whenever a unit 70 operates to connect a generator with the battery. It will be understood that these contacts are mounted and controlled in a manner similar to contacts 101 and 102 of control 70 shown in Fig. 3. Therefore when any one of the generators 10 becomes connected with the battery 13 through the operation of the control unit 70, then the standard cell 110 becomes connected with the voltage divider 119, and the lamp 123 is connected with the battery.

So long as the generator 10 having the voltage divider 119, is generating the predetermined voltage, the voltage $x$ of the divider will equal the standard cell voltage, and the galvanometer needle will point to zero and the mirror 121 will reflect the light beam back on itself so that it does not affect either of two photoelectric cells 131 connected in bucking relation. If there is a deviation of voltage $x$ from the standard cell voltage, the mirror 121 will turn to cause the light beam 122 to be reflected upon one or the other of the photoelectric cells 130, 131. If the beam falls on cell 130, current will flow in one direction to an amplifier 132 or if the beam falls on cell 131, current will flow to the amplifier in the opposite direction. The effect of the beam upon the cells 130 or 131 is amplified by the unit 132 which is connected with all of the regulator coils 23.

When all of the generators 10 become disconnected from the battery through the operation of the control unit 70, the standard cell 110 is disconnected from the voltage divider 119 and the lamp 123 is disconnected from the battery 13.

While the embodiments of the present invention as herein disclosed, constitute preferred forms, it is to be understood that other forms might be adopted, all coming within the scope of the claims which follow.

What is claimed is as follows:

1. A system of generator regulation comprising a storage battery, a generator for charging the battery, a constant voltage source, means responsive to differences between a voltage produced by the generator and a voltage produced by the constant voltage source, and a voltage regulator for the generator under joint control by generator voltage and by said means.

2. A system of generator regulation comprising a storage battery, a generator for charging the battery, a constant voltage source, means responsive to differences between a voltage produced by the generator and a voltage produced by the constant voltage source, and a voltage regulator for the generator comprising a field regulating resistance and an electromagnet for controlling the resistance and having a coil connected with the generator, and a coil under control by said means.

3. A system of generator regulation comprising a storage battery, a generator for charging the battery, a pilot generator having a separately excited field, a constant voltage generator connected with the field of the pilot generator and in opposing relation with the battery charging generator whereby the pilot generator generates current responding, in direction and voltage, to algebraic differences between the battery charging voltage and the voltage of the constant voltage generator, means for driving the pilot generator and the constant voltage generator, and a voltage regulator for the battery charging generator under joint control by the voltage of said generator and by the voltage and direction of the current generated by the pilot generator.

4. A system of generator regulation comprising a storage battery, a generator for charging the battery, circuit control means for connecting said generator with the battery when the voltage of the generator attains a certain value and for disconnecting the generator from the battery when generator voltage is below battery voltage, a pilot generator having a separately excited field, a field exciting generator having its armature connected with the field of the pilot generator and in opposing relation with the battery charging generator whereby the pilot generator generates current responding, in direction and voltage, to the algebraic differences between battery charging voltage and the voltage of the field exciting generator, a voltage regulator for the field exciting generator, a constant speed device for driving the pilot generator and the field exciting generator, means for connecting the field exciting generator with the battery charging generator when said battery charging generator is connected with the battery, means responsive to abnormal current flow from the battery charging generator to the field exciting generator for disconnecting the latter from the former, and a voltage regulator for the battery charging generator under joint control by the voltage of said generator and by the voltage of the pilot generator.

5. A system of generator regulation comprising a storage battery, a generator for charging the battery, a constant voltage source comprising a standard primary cell, a voltage divider connected with the generator and so connected with the cell that standard cell voltage is opposed by an equal divider voltage when the voltage across the generator terminals is a predetermined value, means responsive to deviations of said divider voltage from standard cell voltage for producing the flow of an electric current in a direction depending on whether the deviation is plus or minus, and a voltage regulator for the generator under joint control by generator voltage and by said means responsive to deviation of said divider voltage from standard cell voltage.

6. A system of generator regulation comprising a storage battery, a generator for charging the battery, a constant voltage source comprising a standard primary cell, a voltage divider connected with the generator and so connected with the cell that standard cell voltage is opposed by an equal divider voltage when the voltage across the generator terminals is a predetermined value, a galvanometer responsive to deviations of said divider voltage from standard cell voltage, a mirror operated by the galvanometer two juxtaposed photo-electric cells in bucking relation, a light source and means for directing a light beam between the cells and upon the mirror, said mirror reflecting the beam upon one or the other of said cells according as the deviation of said divider voltage from standard cell voltage is plus or minus, whereby the direction of flow of photo-electric-cell-produced current is determined by the photoelectric cell activated by the beam, and a voltage regulator for each generator under joint control by generator voltage and by photoelectric cells.

7. The system according to claim 6 further characterized by the provision of means for controlling connection between the generator and the battery, and means responsive to the operation of said connection controlling means for causing the voltage divider to be connected with the standard cell and for causing the light source to become operative.

WILLIAM J. RADY.